(12) United States Patent
Bogdanowicz et al.

(10) Patent No.: US 8,857,578 B2
(45) Date of Patent: Oct. 14, 2014

(54) MAGNETIC BRAKE

(71) Applicant: Technical Film Systems Inc., Camarillo, CA (US)

(72) Inventors: Jim M. Bogdanowicz, Camarillo, CA (US); Bruce W. Keller, Camarillo, CA (US); Manfred G. Michelson, Camarillo, CA (US); Markus G. Michelson, Camarillo, CA (US)

(73) Assignee: Technical Film Systems, Inc., Camarillo, CA (US)

( * ) Notice: Subject to any disclaimer, the term of this patent is extended or adjusted under 35 U.S.C. 154(b) by 38 days.

(21) Appl. No.: 13/718,831

(22) Filed: Dec. 18, 2012

(65) Prior Publication Data
US 2013/0186721 A1 Jul. 25, 2013

Related U.S. Application Data

(60) Provisional application No. 61/588,513, filed on Jan. 19, 2012.

(51) Int. Cl.
| F16F 15/03 | (2006.01) |
| B60L 7/00 | (2006.01) |
| H02K 7/10 | (2006.01) |
| H02K 1/32 | (2006.01) |
| F16D 49/00 | (2006.01) |
| F16D 63/00 | (2006.01) |
| H02K 49/04 | (2006.01) |
| H02K 1/20 | (2006.01) |
| H02K 9/22 | (2006.01) |
| F16D 121/20 | (2012.01) |
| H02K 9/06 | (2006.01) |

(52) U.S. Cl.
CPC .............. *F16D 63/002* (2013.01); *H02K 9/22* (2013.01); *F16D 2121/20* (2013.01); *H02K 2213/03* (2013.01); *H02K 1/32* (2013.01); *H02K 9/06* (2013.01); *F16D 49/00* (2013.01); *H02K 49/043* (2013.01); *H02K 1/20* (2013.01)
USPC ............................. 188/267; 188/163; 310/77

(58) Field of Classification Search
CPC ..... H02K 49/065; H02K 7/104; H02K 49/04; F16D 63/002; F16D 2121/20
USPC ........ 188/158–164, 265, 267; 310/76, 77, 92, 310/93, 105
See application file for complete search history.

(56) References Cited

U.S. PATENT DOCUMENTS

| 4,186,320 | A | * | 1/1980 | Hillman | 310/93 |
| 5,238,095 | A | | 8/1993 | Pedu | |
| 5,445,013 | A | * | 8/1995 | Clayton et al. | 73/116.06 |
| 6,247,357 | B1 | * | 6/2001 | Clayton et al. | 73/116.06 |
| 6,680,555 | B1 | * | 1/2004 | Schneider et al. | 310/103 |
| 2008/0047512 | A1 | * | 2/2008 | Lequesne et al. | 123/90.17 |

* cited by examiner

Primary Examiner — Vishal Sahni
(74) Attorney, Agent, or Firm — Kenneth H. Ohriner; Perkins Coie LLP

(57) ABSTRACT

A magnetic brake has an outer stator surrounding an inner stator with a circumferential slot between the outer stator and the inner stator. A coil is provided in the inner stator adjacent to the circumferential slot. A drag plate is attached to a rotatable shaft extending centrally through the inner stator. A drag ring joined to the drag plate extend into the circumferential slot. The drag ring may be an annular cylindrical ring section separate from the drag plate. Vent holes pass through the inner stator adjacent and parallel to the shaft. The magnetic brake uses both hysteresis and eddy current braking.

11 Claims, 15 Drawing Sheets

FIGURE 12: Maximum times allowed for various braking torques at 8000 RPM.

FIGURE 13: Typical brake performance without computer correction.

Fig. 14. Oscilloscope recording showing the torque output for an increasing and decreasing signal.

MAGNETIC BRAKE

This application claims priority to U.S. Provisional Application No. 61/588,513 filed Jan. 19, 2012 and incorporated herein by reference.

BACKGROUND OF THE INVENTION

Magnetic brakes are advantageous for braking rotation and controlling the torque of rotating shafts or other rotating components. For example, during the manufacture or processing of wire, foil, paper, film, or other material wound on a spool or roller, the material may have to be brought to a stop at a predetermined point, such as at end of the roll. In other applications, magnetic brakes may be used to maintain a constant tension on the material during winding and unwinding.

Friction brakes are often not well suited to these uses for several reasons. Friction brakes may not brake unevenly. Friction brakes also generate dust, wear out and require maintenance. Magnetic brakes are contact-less and largely avoid these problems, so that magnetic brakes are generally preferred in winding and unwinding systems. Hysteresis brakes are a common type of magnetic brake that have been in use for many years. However, hysterisis brakes have several drawbacks, including relatively low torque, hysteresis, non-linearity, low power dissipation and high cogging.

Relatively low torque is an inherent characteristic of hysteresis brakes. Hysterisis is a result where as the input current is increased by a certain amount, the output torque of the brake will increase, but when the input current is decreased by the same amount, the torque will not decrease by the same amount. Non-linearity refers to the torque output of hysteresis brakes being dependent on rotation speed. Low power dissipation results from the materials and design of conventional hysterisis brakes. Cogging refers to non-smooth rotation at low speeds caused by residual magnetism.

FIG. 15 shows an example of a prior art hysteresis brake having a drag cup 23' of material that can be magnetized. Typically the drag cup 23' is manufactured from a single sheet of steel that either is spun or deep drawn. The cup 23' is mounted on a rotating shaft 17' with a drag ring 12' on the drag cup 23' rotating in a gap between the poles of the magnet. Hysteresis brakes do not wear because the parts are not in contact, although the rotating shaft is supported on ball bearings. The hysteresis effect will produce a certain residual cogging when the drag ring 12' is stopped with current applied to the coil 13'. This cogging is due to the residual magnetic fields in the drag ring 12' which remain after the current in the coil 13 switched off. Accordingly, improvements in magnetic brakes are needed.

DETAILED DESCRIPTION OF THE DRAWINGS

Figure 1:
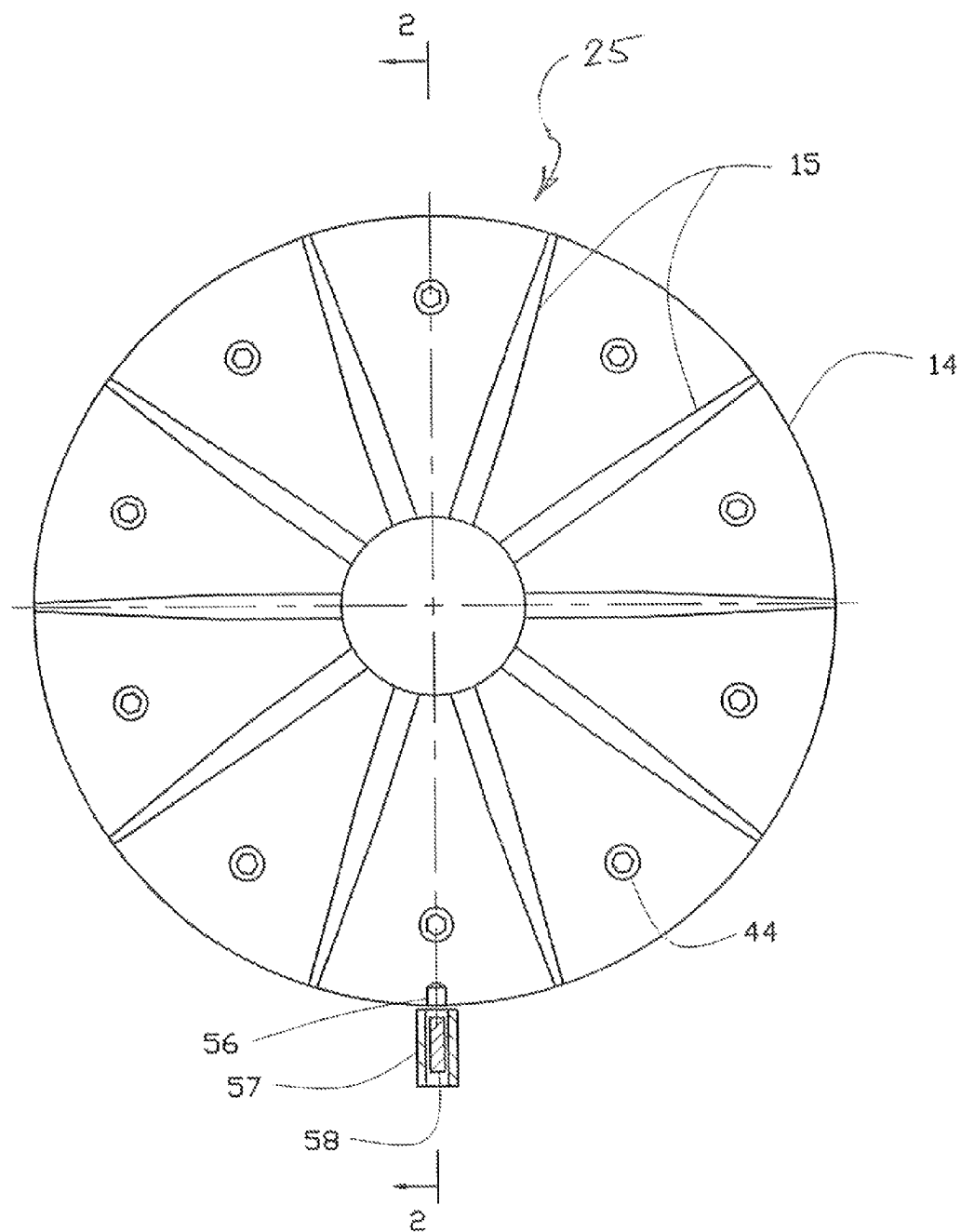
FIG. 1 is a plan view of the magnetic brake.

Turning now in detail to the drawings, as shown in FIGS. 1-4, a brake 25 includes an inner stator 11, an outer stator 10 and a drag ring 12 attached to a drag plate 21. A coil 13 between the inner and outer stators is connected to an NC current source 45 shown in FIG. 2. An impeller 14 is attached to the drag plate 21. The impeller 14 may be made of a material having high thermal conductivity, such as copper or aluminum. The drag plate is rotatably supported on a shaft 17 via bearings 16. The shaft is connected to a motor or other rotating member (not shown) that the brake 25 stops from rotating or otherwise controls.

Figure 3:
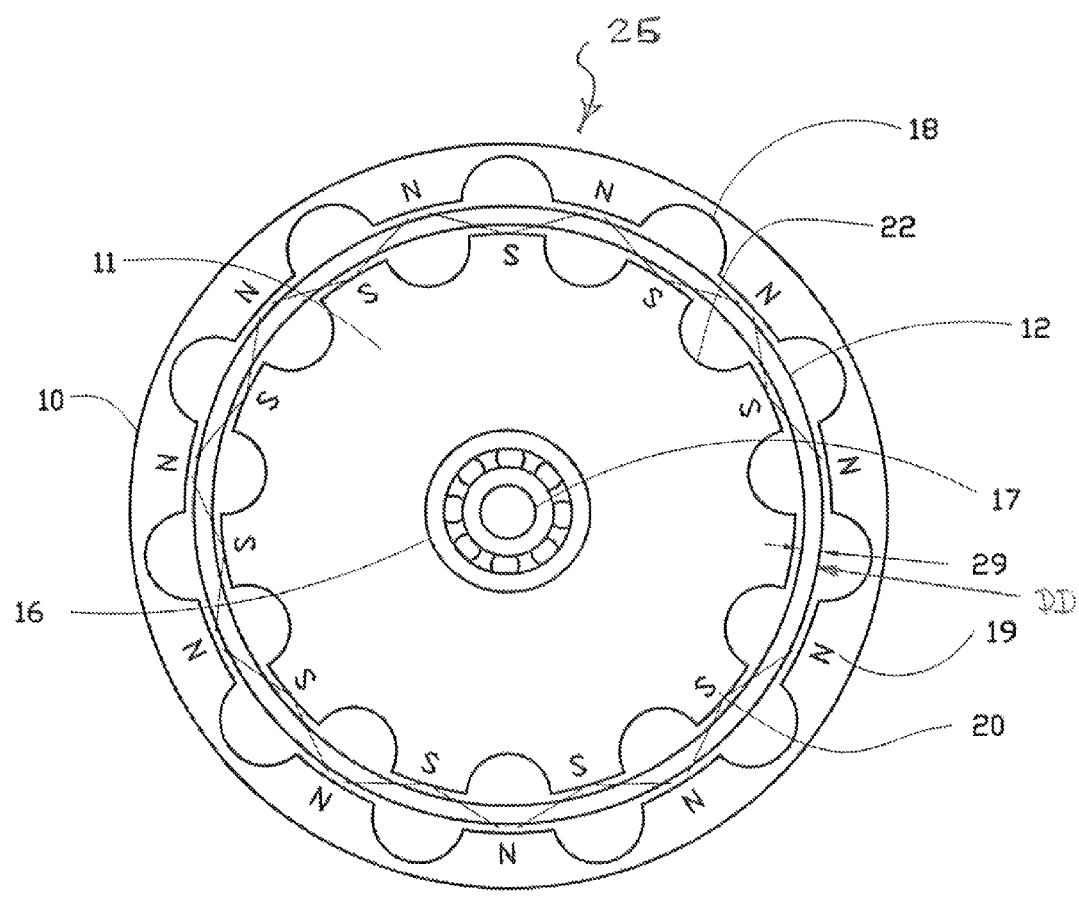
FIG. 3 is plan view of the inner and outer stators taken through plane 3-3 of FIG. 2.
Figure 4:
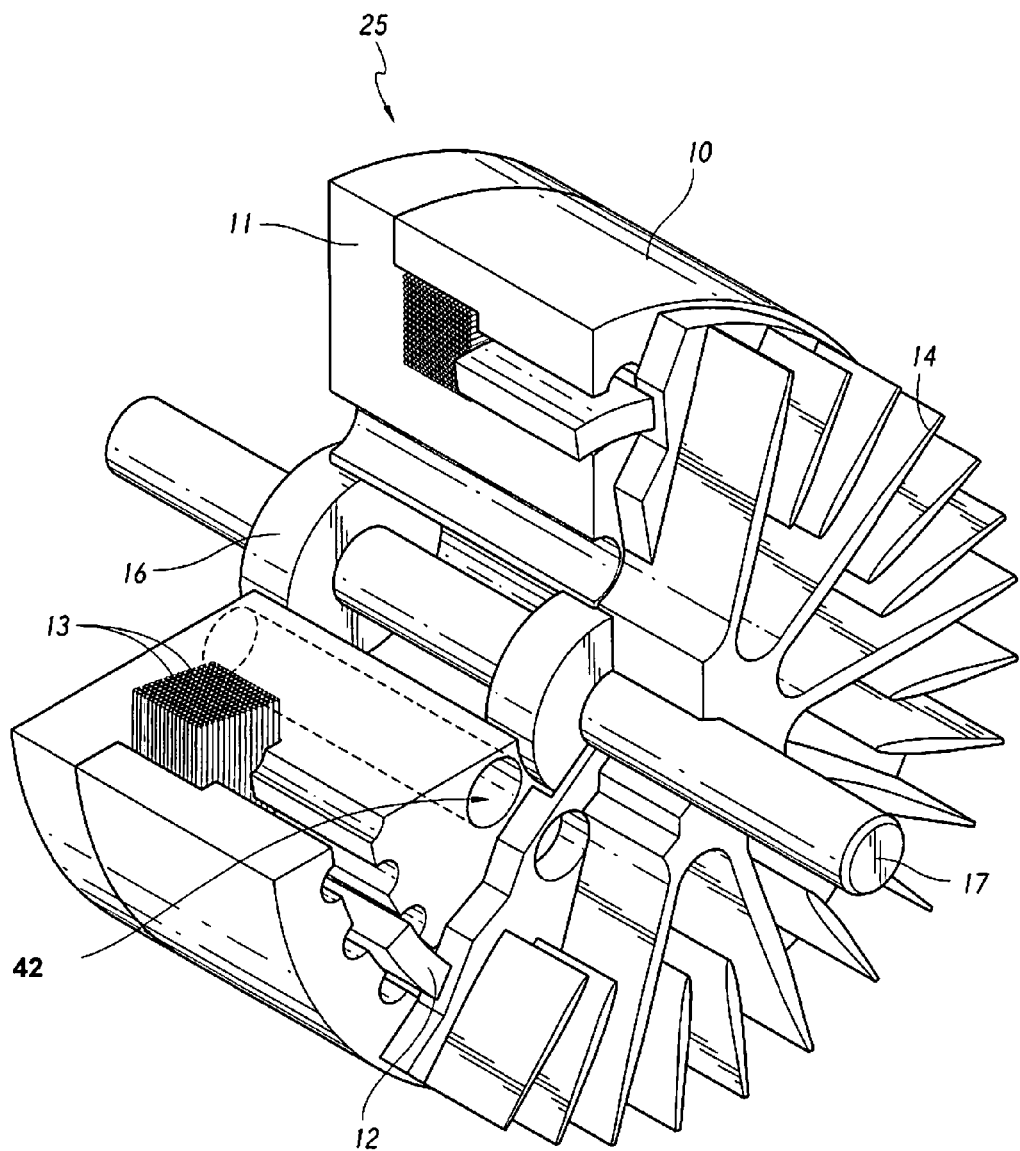
FIG. 4 is perspective cutaway view of the magnetic brake shown in FIG. 1.

As shown in FIG. 3, the inner and outer stators 11 and 10 may have scallops 22 and 18, to concentrate the magnetic field. As the drag ring 12 passes between the North 19 and South 20 poles, the magnetic domains of the drag ring reverse. This causes a drag or energy loss.

Figure 11:
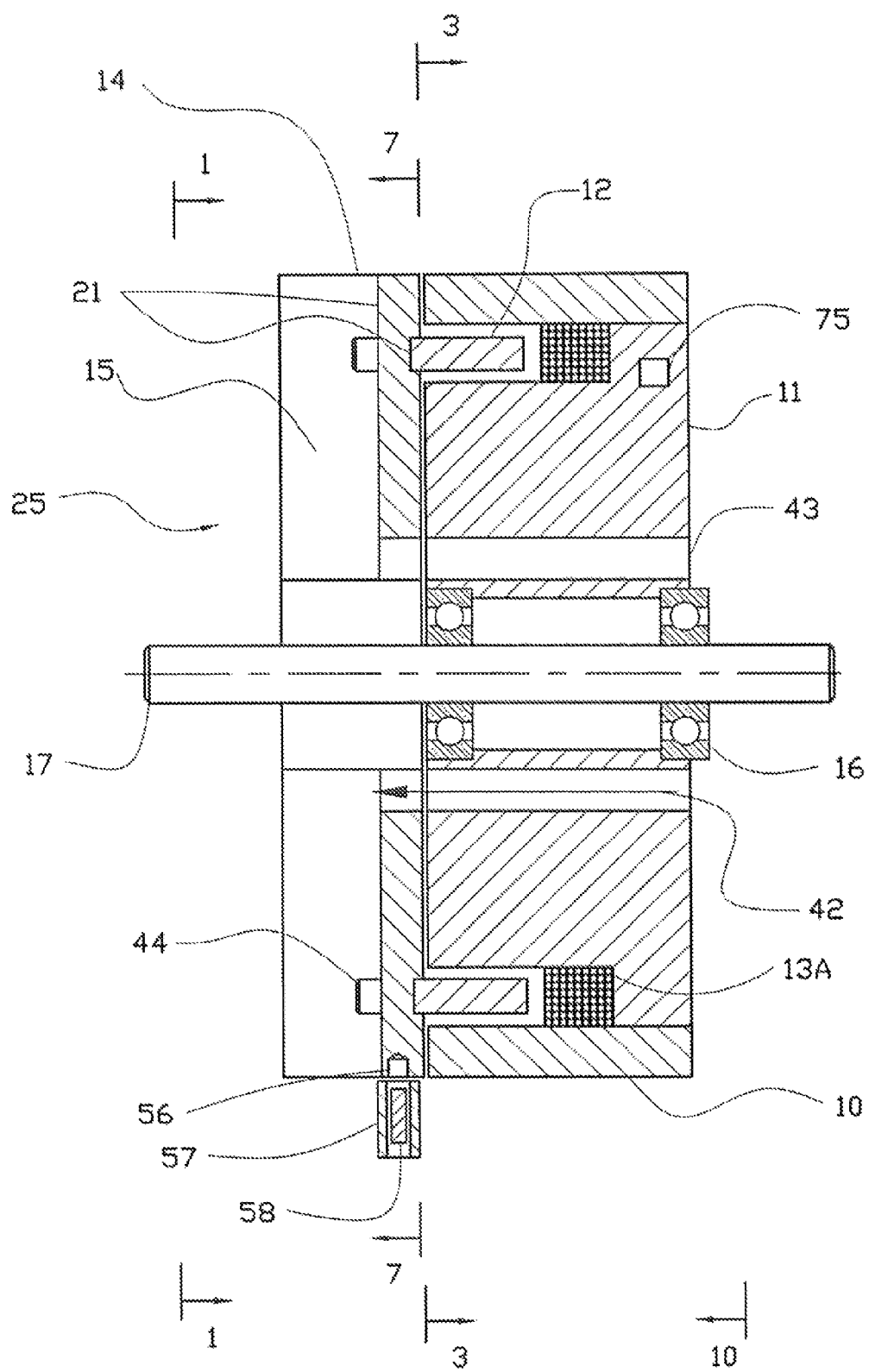
FIG. 11 is a side, sectional view of an alternative magnetic brake.

FIG. 11 shows an alternative embodiment where for ease of manufacturing the brake, magnetic coil 13A essentially has the same outside and inside diameters as the outside and inside diameters of the groove for drag ring 12.

Increasing Braking Power

Figure 8:
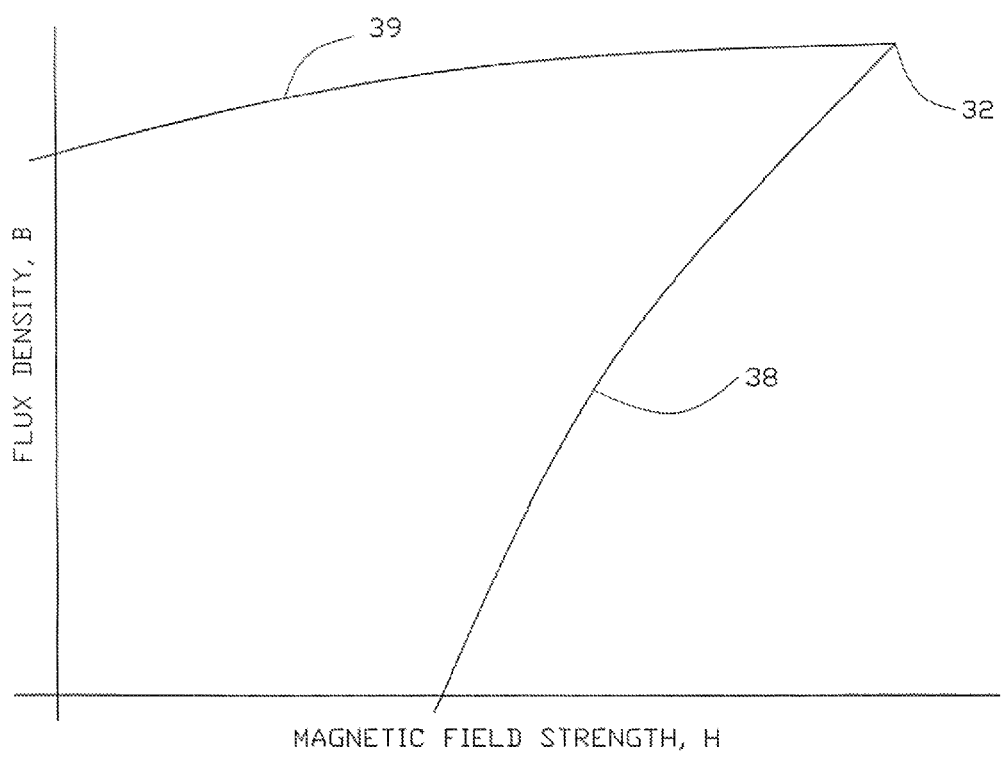
FIG. 8 is a chart of flux density as a function of field strength.

FIG. 8 shows the flux density B as a function of field strength H for a magnetic material in the first quadrant. The energy dissipated by a drag ring 12 moving through a complete flux reversal is the total integral of the area between the increasing magnetic field strength curve 38 and the decreasing magnetic field strength curve 39 for all four quadrants. Maximizing energy dissipation requires a drag ring material that has a high flux density for a high magnetic field strength. The materials for the outer stator 10 and inner stator 11 should generate magnetic field strength produced by the coil 13 at the drag ring 12 at or above the saturation point of the drag ring material, to provide higher torque. However, this may increase hysteresis and cogging.

Eddy currents are created in magnetic materials when the material is passed through a magnetic field. Since energy is dissipated as heat, the eddy currents can be used to cause braking in addition to or in combination with hysteresis braking. The braking torque provided by eddy current braking is proportional to the shaft speed and is zero at zero speed. This may be undesirable where constant braking torque is needed, but it is helpful when additional braking at higher speeds is needed.

Figure 15:
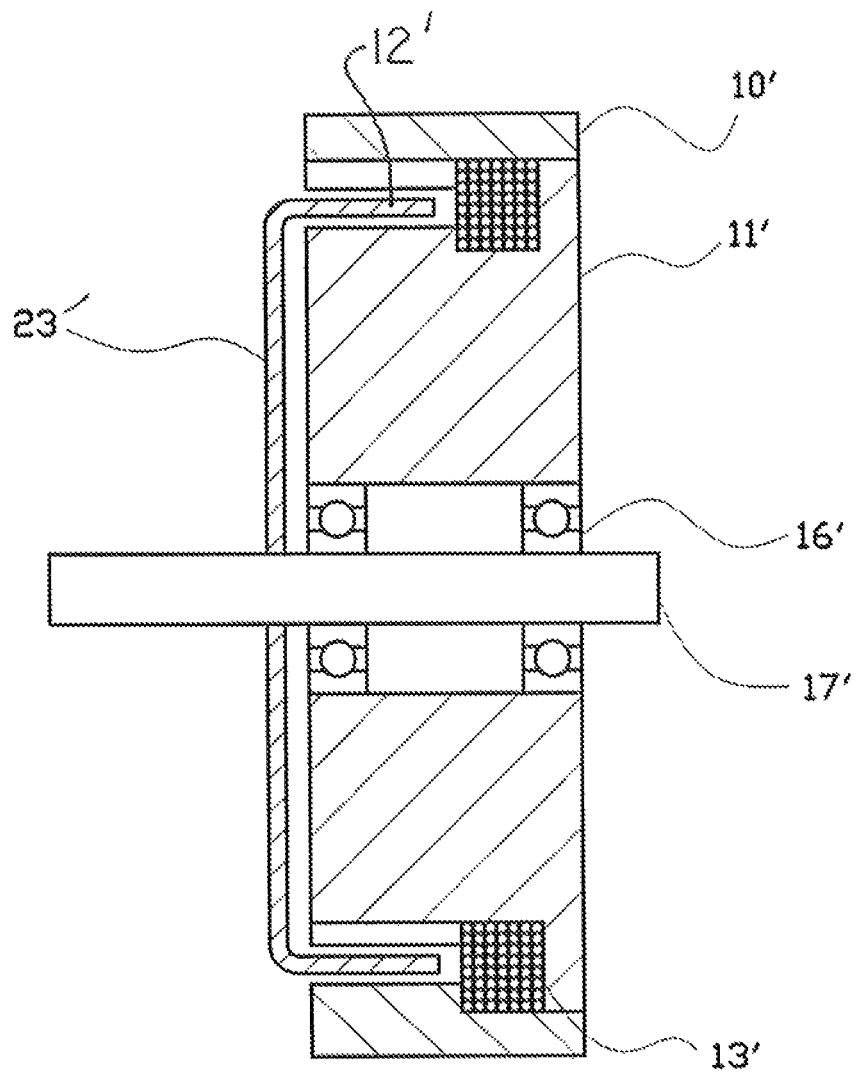
FIG. 15 is a section view of a prior art brake.

When relatively thin magnetic materials are exposed to an alternating magnetic field, very little eddy current losses occur. Increasing the thickness of drag ring 12, increases the eddy current losses, providing increased braking power in the brake 25. The drag ring 12 may be thicker than the drag cup 23' used in prior art brakes as shown in FIG. 15. Instead of using a spun or deep drawn drag cup, the drag ring 12, the drag plate 21 and optionally the impeller 14 may be provided as separate, connected components. The relatively thicker drag ring 12 is capable of conducting and dissipating more heat than prior art designs. As one example, the drag ring 12 may be a hollow cylindrical section having a wall thickness ranging from about 0.02 to 0.08, 0.03 to 0.07, or 0.04 to 0.06 times the outer diameter DD of the drag ring 12. In the example shown in FIGS. 1-4, bolts or screws 44 connect the drag ring 12 to the impeller 14. Other types of fasteners, high-strength adhesives, welding, press fitting or other connections may alternatively be used. The drag ring and the impeller may also optionally be threaded and then screwed together.

To increase braking power, the drag ring material may be selected for the highest remanence and coercivity regardless of the material's torque linearity as a function of the magnetic field strength, hysteresis and cogging characteristics. The operating point of the drag ring preferably is at or near saturation point 32 shown in FIG. 5.

Figure 12:
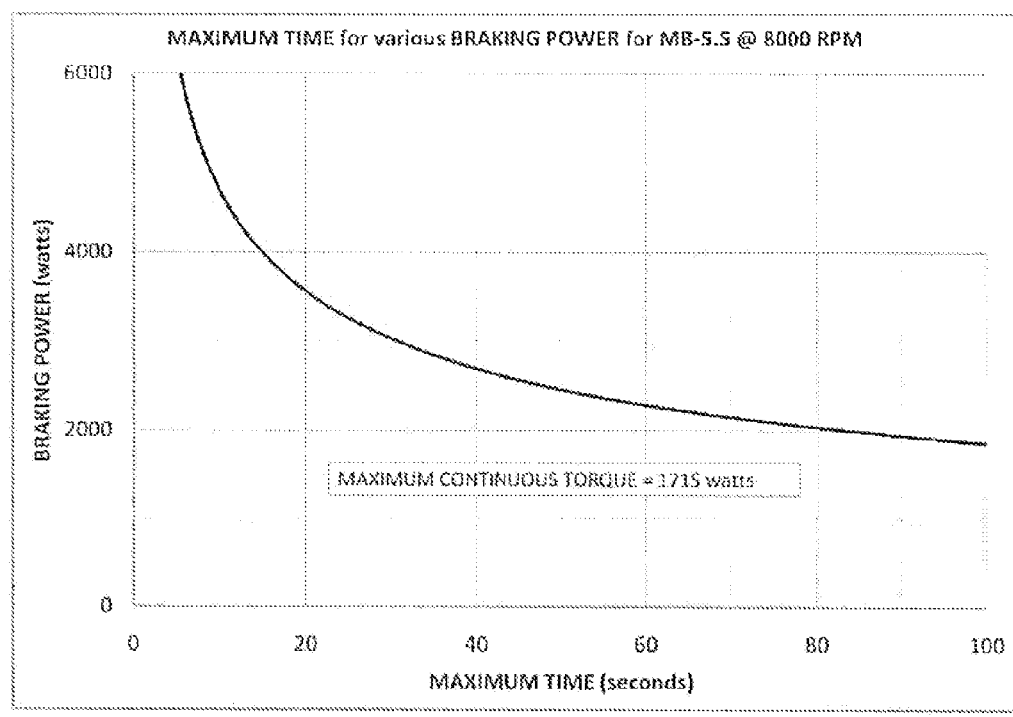
FIG. 12 is a graph of maximum time vs. braking power.

The brake 25 is adapted for both transient and steady state power dissipation. During braking, kinetic energy is dissipated by the brake 25 as heat in the drag ring 12. The heat is generated by both hysteresis and eddy current effects. Transient or short term heat dissipation is largely a function of the thermal inertia of the drag ring 12. In many applications, such as decelerating a large diameter (e.g., 3 foot) roll of material to a quick stop, very short term high-energy dissipation is essential. As one example shown in FIG. 12, a brake 25 with a 4.6 inch drag ring diameter can dissipate 4,700 W, or about 6 hp, for a period of 10 seconds.

Steady state or continuous power dissipation is increased by the impeller 14 and ventilation holes 42 shown in FIG. 1. The impeller 14 acts a centrifugal blower and creates a slightly negative pressure at the ventilation holes drawing air through the ventilation holes. The pressure produced by the impeller varies with the square of the angular velocity of the impeller. When the brake is running at very low speeds, the impeller provides limited power dissipation, but there is also little or no heat being generated. Conversely, at high speed when high power is generated the airflow provided by the impeller is substantial. The brake 25 may set up to run at a maximum allowable speed, optionally using gears or belts.

Linearization

Output torque is the braking torque exerted by the brake 25 in the direction opposite to the spin direction of the shaft 17. Output torque is a function of the input current for the magnetic brake. However, torque is not a linear function with respect to current. For the brake to supply a particular, controlled torque, the system may advantageously account for the non-linearities.

Figure 5:
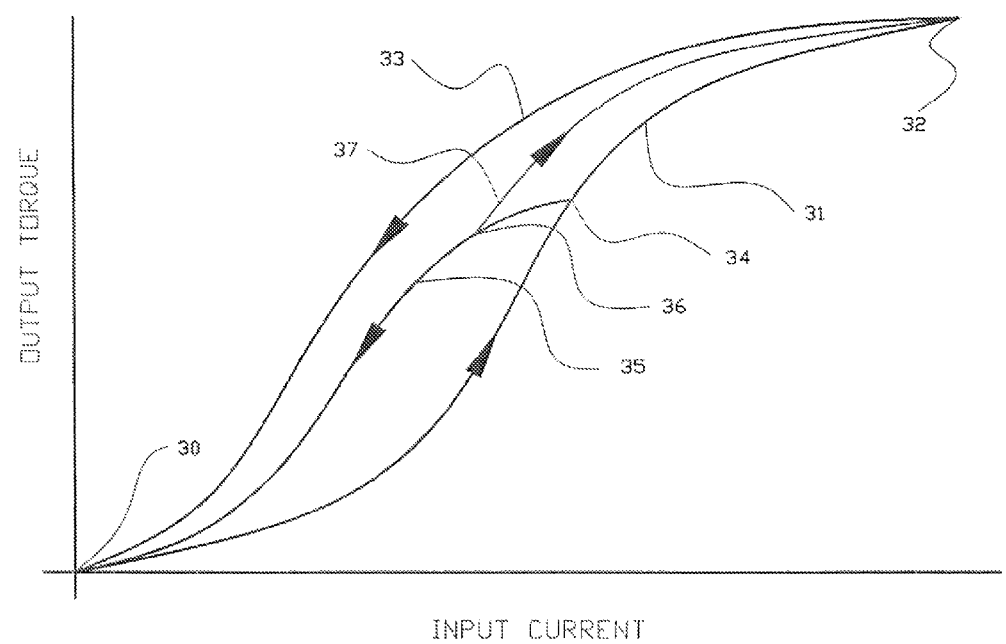
FIG. 5 is a graph showing a hysteresis loop.

FIG. 5 shows the non-linearities of prior art hysteresis brakes. The X-axis shows the current in the coil 13, and the Y-axis shows the output torque. In FIG. 5 curve 31 is the outer increasing current and curve 33 is the outer decreasing current. When current is introduced into the coil 13 it increases from zero at origin 30 along the graph 31 to some nominal maximum at saturation point 32. Non-linearity also exists when the current decreases from saturation point 32 along a different curve 33 to the origin 30.

An inner decreasing current path 35 extends an arbitrary point 34 on the graph representing an output torque for an increasing input current. An example is output torque applied to a spool, roller or reel when the film or other material being wound or unwound is at a known radius from the center of the roller. For every point along the outer increasing current graph 31, there exists a different down path to the origin 30. Analogously, an inner increasing path 37 extends from the arbitrary point 34 to the saturation point 32. As the size of the spooled material increases or decreases during winding and unwinding, the output torque should ideally change linearly. However, as FIG. 5 shows, the relationships between current and torque are not linear.

Linearization may be achieved by measuring the outer increasing current graph 31 and the outer decreasing current graph 33 plus multiple, possible inner increasing current graphs and multiple, possible inner decreasing current graphs. One graph extends downward from arbitrary point 34 on increasing current graph 31. Likewise, different inner increasing paths other than path 37 exist for points other than arbitrary points 34.

Graphs showing decreasing and increasing current paths from many other arbitrary points along increasing current graph 31 may be stored in computer memory.

A large number (e.g., 1000) graphs may be measured and stored. Alternatively a relatively small number of graphs (e.g., 25) may be measured with interpolations and extrapolations made between them. These interpolated or extrapolated graphs may be computed at the time they are needed or may be stored in the computer memory for future access.

These stored graphs may be used to calculate an input signal for the coil 13, such that a linear input to the computer 27 will produce a signal which, when fed to an amplifier, will produce a current to the coil 13, such that the output torque of the magnetic brake has a linear relationship to the computer input signal.

The linearization of the torque as a function of the input signal and elimination of the hysteresis can be divided into four parts: (1) measuring the characteristics of the magnetic brake 25 and storing this data as torque curves as a function of input current for a particular brake design; (2) converting this data into mathematical equations; (3) storing these equations into a computer 73 shown in FIG. 9, and solving the stored equations; and (4) computing the required current for the brake to produce a torque that is proportional to the computer input signal.

Figure 6:
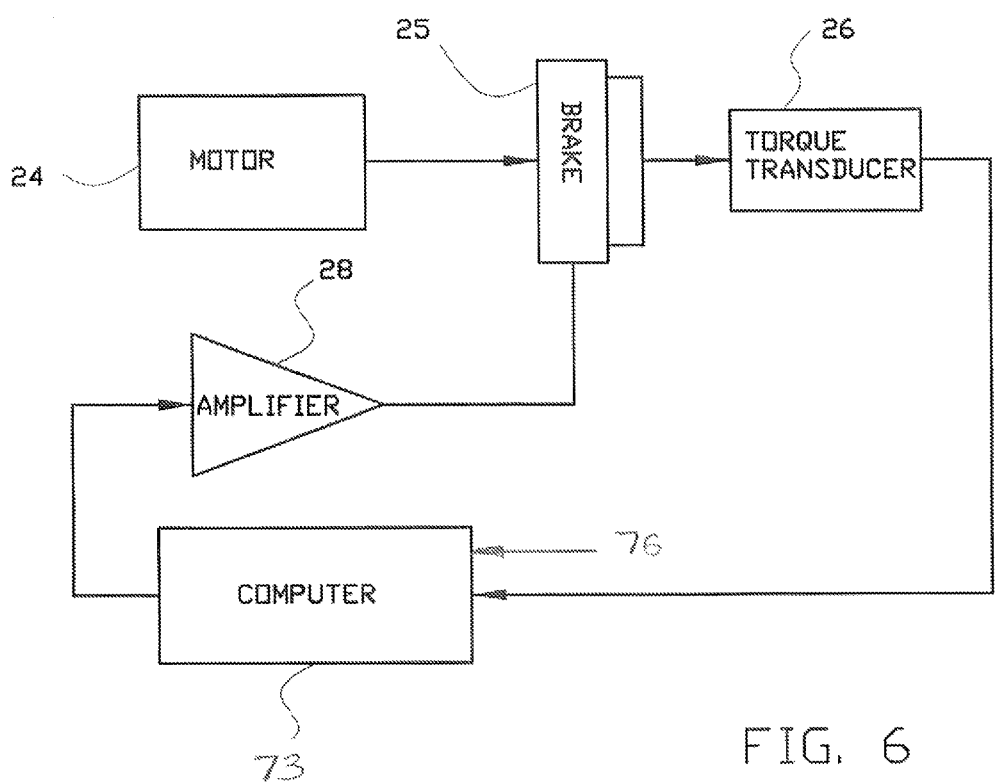
FIG. 6 is a schematic diagram of a system for measuring torque as a function of input current to the coil of the brake shown in FIGS. 1-4.

Measuring the output torque as a function of the input current may be done using the measurement system shown in FIG. 6. In normal operation when the brake is not activated, a motor 24 rotates a drag plate 21 of the magnetic brake 25 at a nominal speed. During braking, the digital computer 73 generates a signal that is transmitted to an amplifier 28. The digital computer can be a programmable integrated circuit designed for these tasks. The amplifier 28 transmits a current to the coil 13 of the brake 25. A torque transducer 26 measures the output torque from the magnetic brake 25 and transmits a signal proportional to the braking to the digital computer 73.

Depending upon what torque accuracy is required, either a few of the inner graphs or a larger number of inner graphs may be measured to use for the input current. Since any measurement system has some noise, it may be easier to measure the torque for a specific current level several times and average these values.

Once the desired set of points for the inner increasing current graphs 37 and the desired set of points for the inner decreasing current graphs 35 are measured, they may be stored either as individual points or as a set of equations. The equations may be generated using non-proprietary software known as "Open Source Least Squares Polynomial Fit Function," such as the polyval function, which is part of the NumPy package (a package for scientific computing in the Python programming language, available on the Internet). See http://www.java2s.comlOpen-SourcelPythonl3.1.2-PythoniCatalog3.1.2-Python.htm (accessed Dec. 6, 2011). These equations either may be exponential equations or piece-wise linearized expressions. Once a sufficient number of equations are calculated, they may be stored in the computers dedicated for each particular model brake. What is a sufficient number depends upon what accuracy desired. Storing more equations yields higher accuracy.

To have the brake 25 produce a specified torque, the computer 73 determines what the torque is and increases or decreases the last torque value and last computer input value. Based upon whether the signal is increasing or decreasing, the computer 73 chooses either the inner increasing set of equations or the inner decreasing set of equations. From this set of equations, the computer finds the two equations that are closest to the new input value. The computer solves these two equations for the new input value. The solution to these two equations is the current values that yield a torque that is a linear function of the input value. The two values are now interpolated or extrapolated to obtain the exact input current value. The amplifier 28 applies this input current to the coil 13 of the brake 25. The result is that the output torque is proportional to the signal input into the input port.

Change in the radius of the spool is only one reason to control torque. Other winding and unwind processes may require that the torque be controlled. Eddy current braking, unlike hysteresis braking, is proportional to the rotational speed of drag ring 12. In the brake 25, eddy current braking as a function of the speed is measured when the brake 25 is built. Eddy current braking adds to the hysteresis braking. At zero speed, the braking is only due to the hysteresis braking. At non-zero speeds, eddy current braking is proportional to speed and adds to hysteresis braking.

Figure 9:
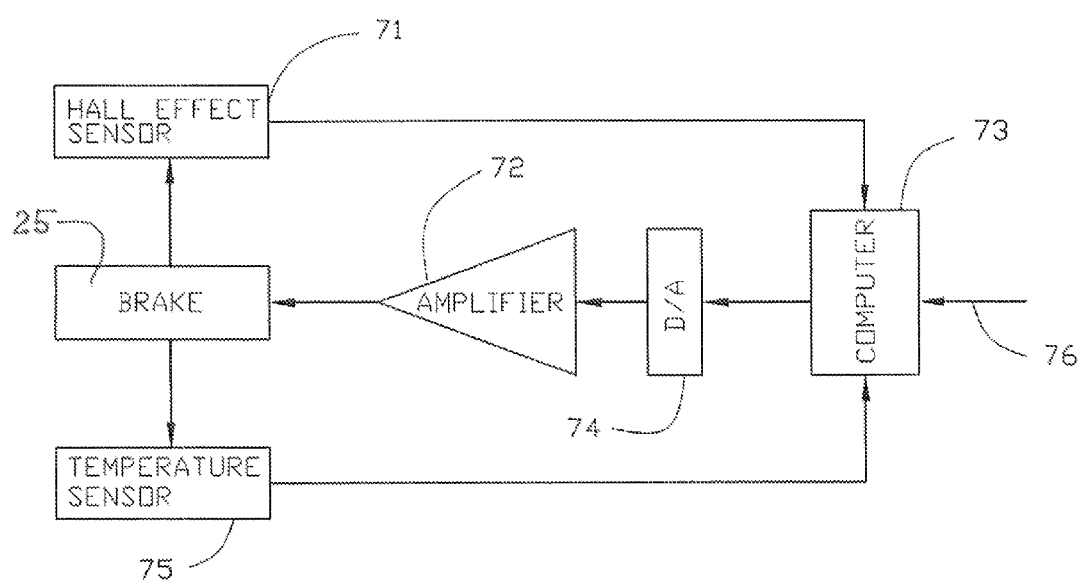
FIG. 9 is a schematic of a controller for the magnetic brake.

A shown in FIG. 9, a representative braking system includes a magnetic brake 25, a speed sensor 71 and a temperature sensor 75 linked to a computer 73. The computer includes an input port 76 for entering the desired output torque into the computer. Signals from the computer are converted to analog in D/A converter 74. From there, the analog current is amplified in current amplifier 72 to coil 13 of the brake 25. The sensor 71 measures the speed of the drag plate 21 and transmits it to a computer 73 where speed coefficients are stored. Consequently, it is possible for the computer 73 to compute the necessary input signal for the current amplifier 72 such that the torque does not change with speed. If the desired output torque of the brake 25 is higher than the maximum hysteresis braking torque available, the desired torque can only be obtained above a certain angular velocity of the drag ring 12 but can nevertheless be held constant above a certain angular velocity.

Unwinding tension is a function of brake torque and the radius. Changes in radius may be measured by sensing timing pulses from a second roller having a constant radius. The tension is then a function of the ratio of the time between pulses from the fixed radius roll divided by the time from the variable radius roll. The computer 73 may adjust the input current to the coil 13 to obtain a constant tension. Similarly, the tension on the roll being wound can be measured and adjusted.

Reducing or Eliminating Hysteresis and Non-Linearity

Hysteresis and non-linearity may be reduced or eliminated using the system shown in FIG. 9. The torque-versus-current characteristic of a brake 25 is measured with a dynamometer having a variable speed motor, a torque arm, and a load cell. The computer or microcontroller 73 controls the speed and magnetic brake current. The computer 73 may run the brake 25 through all possible torque and speed ranges for both increasing and decreasing currents in approximately 1% increments. The result is that up to 100,000 current-torque points may be measured and then stored in the computer 73 for various speeds up to the maximum allowable speed for that particular brake.

Figure 13:
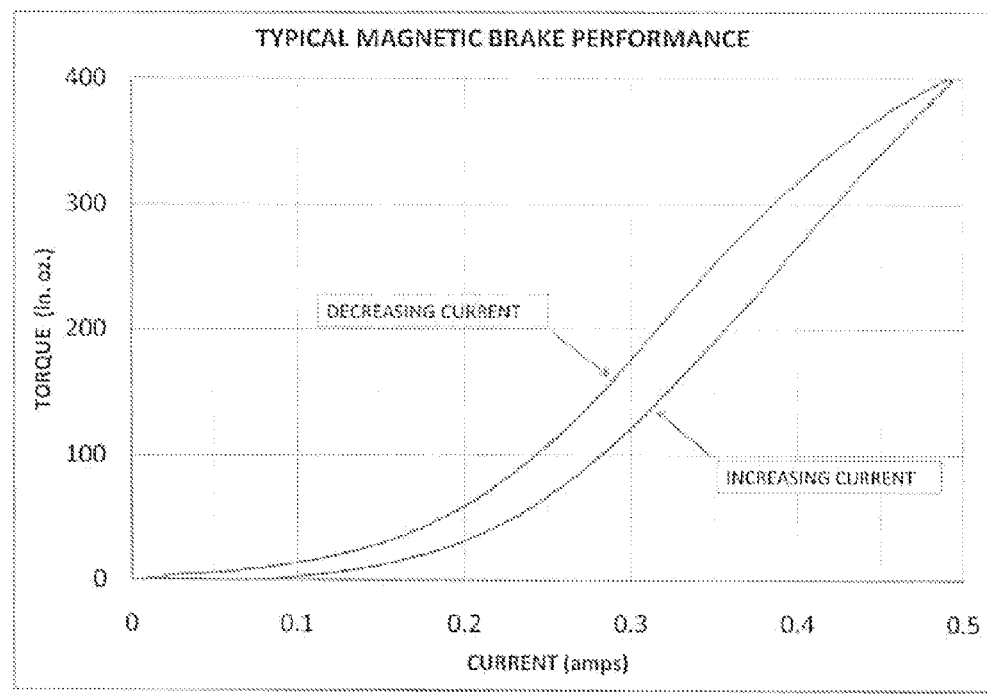
FIG. 13 is a graph of typical brake performance without computer correction.
Figure 14:
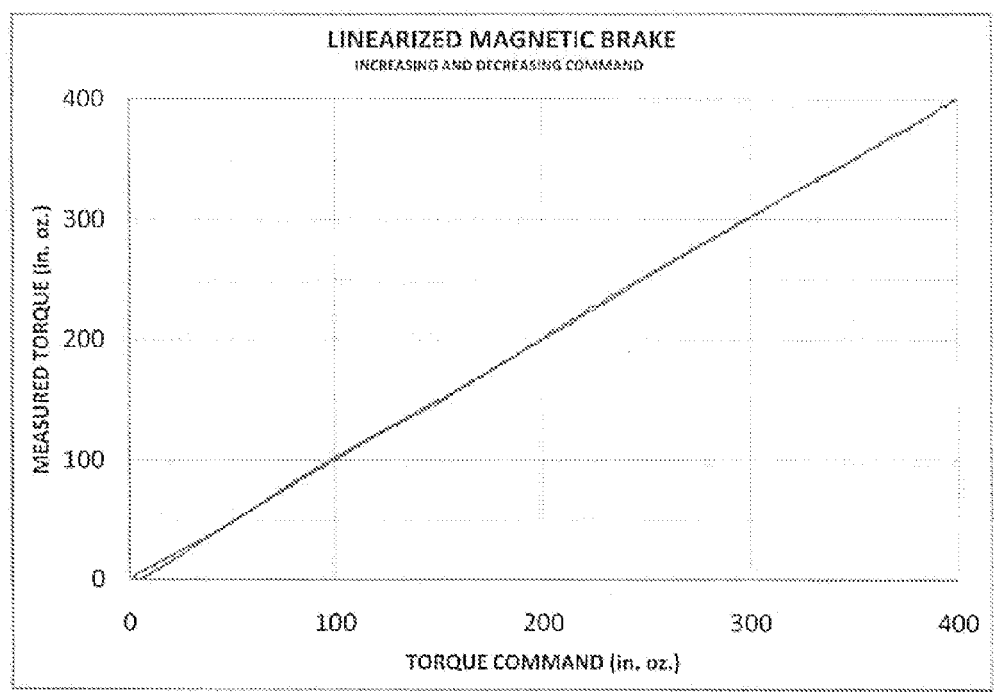
FIG. 14 is a graph of torque output for the brake system shown in FIGS. 1-4 and 9.

To provide a predetermined torque, the computer 73 may interpolate the data points in memory to determine what current will produce the required torque. The computer 73 may continuously sense whether the input signal is increasing or decreasing and thus is able to pick the proper points on the graph shown in FIG. 13. FIG. 14 shows a measurement of torque output as a function of an increasing input signal and a decreasing input signal.

Cooling System

When the brake 25 is activated, i.e., current when is applied to the coil 13 and the drag ring 12 is rotating, energy is dissipated as heat in the drag ring 12. The temperature of the drag ring 12 can exceed 300° C. (572° F.). Accordingly, dissipating heat becomes significant. The brake 25 cools the drag ring 12 through conduction of heat from the drag ring 12 to the impeller 14 and from there into the cooling vanes 15 shown in FIGS. 1 and 2. Air flowing over the drag ring 12 also cools the drag ring via convection. Convection also occurs via air flowing though vent holes 43 through inner stator 11. External brake surfaces provide cooling via radiation. To maximize radiation heat transfer, the emissivity, i.e., the relative ability of surfaces to radiate energy, of the brake surfaces should as high as possible. A black surface has a much higher emissivity than a reflective light colored surface. Ferrous components of the brake 25 may have a black oxide coating and aluminum components may have a black anodize surface finish, to increase emissivity.

Figure 10:
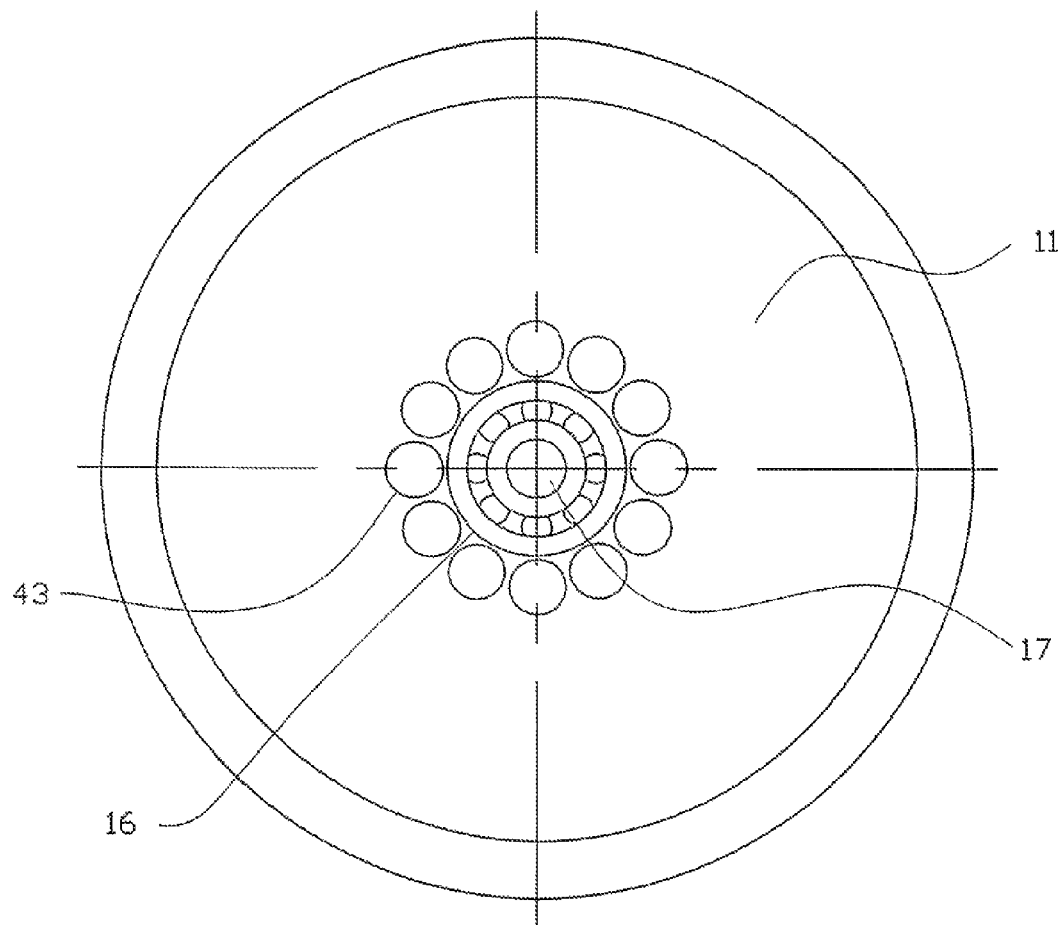
FIG. 10 is a plan view of the inner stator.

The relatively thick drag ring 12 provides for high thermal conduction from the drag ring to the impeller. Cooling vanes 15 drive air to the outer periphery of the impeller 14 to cool the impeller. This airflow may be the primary source for cooling of the impeller and drawing air through the vent holes 43. As shown in FIG. 10, vent holes 43 may be located radially about the bearing 16 in the inner stator 11 where they may act as thermal insulators for the bearings 16. As the impeller 14 rotates, air is drawn into the center of the impeller 14 from the vent holes 43.

Figure 2:
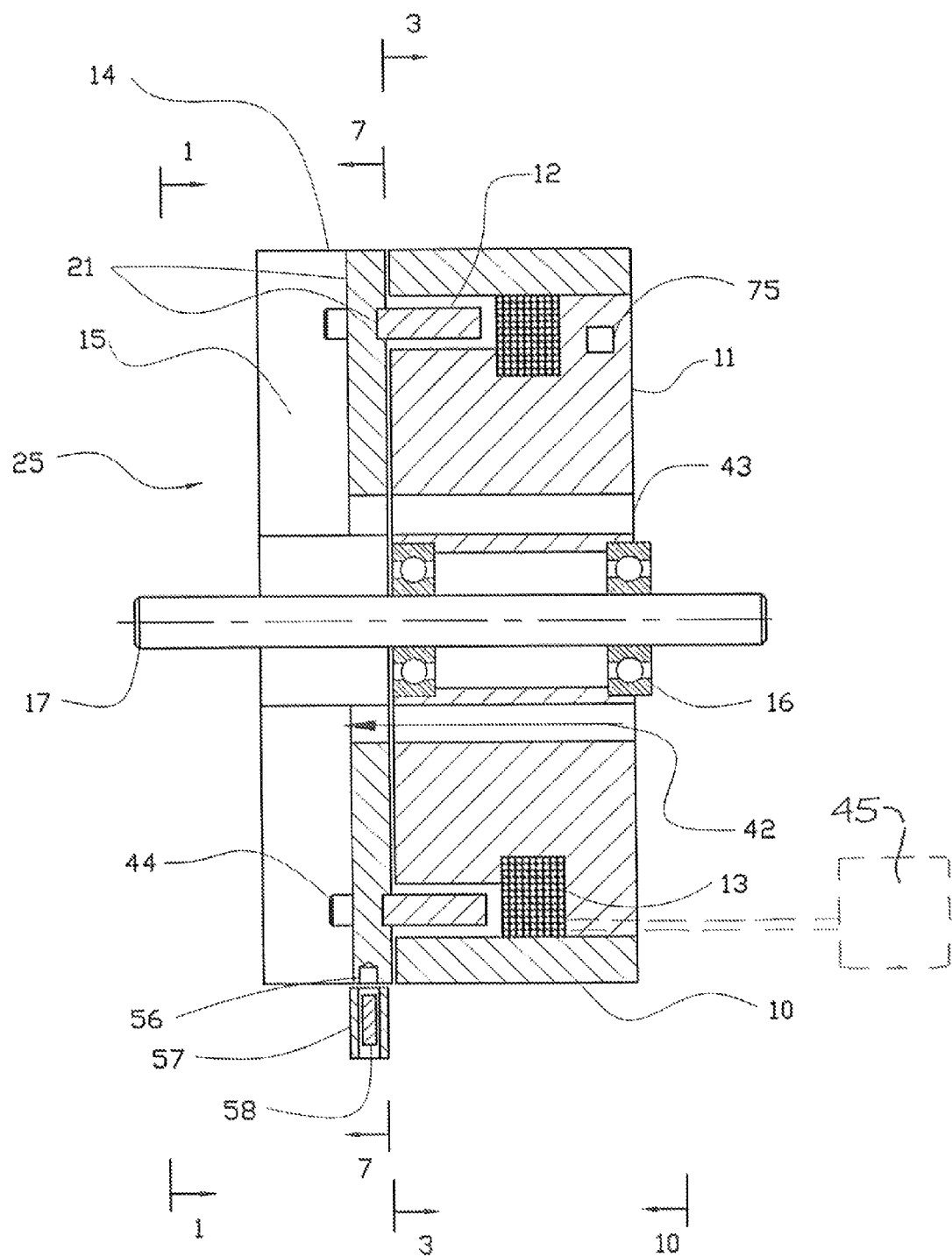
FIG. 2 is a side, sectional view of the magnetic brake taken through plane 2-2 of FIG. 1.

As shown in FIG. 2 the impeller need not be formed together with the drag plate. Accordingly, it can be manufactured of as a thick section of highly thermally conductive material. The drag ring 12, the drag plate 21 and the impeller 14 may also optionally be made of different materials. Thermally conducting grease may be applied to the interface between the impeller 14 and the drag plate 21, and the interface between the drag plate 21 and the drag ring 12, to improve thermal conductivity between them.

Referring to FIGS. 2 and 9, to operate the brake 25 at maximum power, a temperature sensor 75, such as a thermistor, may be installed in the outer stator 10, the inner stator 11 or in another appropriate location. An infrared sensor may optionally be mounted adjacent to the brake 25. The output from the temperature sensor is transmitted to the computer 73. If the temperature exceeds a specified limit, the computer may compensate, for example, by operating the brake at less than maximum power.

Cogging

The hysteresis effect can produce residual cogging when drag ring 12 is brought to a stop while current remains applied to the coil 13. Cogging is due to the residual magnetic fields in the drag ring, which remain after the current in the coil 13 has been brought to zero. In the brake 25, cogging may be reduced or avoided by applying an alternating decaying current, such as a sine wave, to the coil 13. The first few cycles of the decaying current may cause the drag ring 12 to rotate slightly, causing a reduction in de-magnetization. Consequently, the drag ring may be locked into position to improve de-magnetization.

Before the drag ring is locked into position, it should have stopped rotating. Determining the speed of the drag ring can be accomplished in several ways. One method is to embed one or more permanent magnets 56 into the periphery of the impeller 14, as shown in FIG. 2. A Hall Effect sensor 58 may be placed near the outside of impeller 14. As the magnets 56 rotate with the impellor, the Hall Effect sensor 58 generates pulses which are transmitted to computer 27. When the Hall Effect sensor 58 receives no signals for a selected period of time, the impeller 14 is presumed to be stopped. To shield the sensor 58 from the magnetic field of the coil 13, a magnetic shield 57 may be placed around the sensor. To be effective, the magnetic shield 57 should have a high $\Delta B/\Delta H$, where B is the flux density and H is the magnetic field strength.

Figure 7:
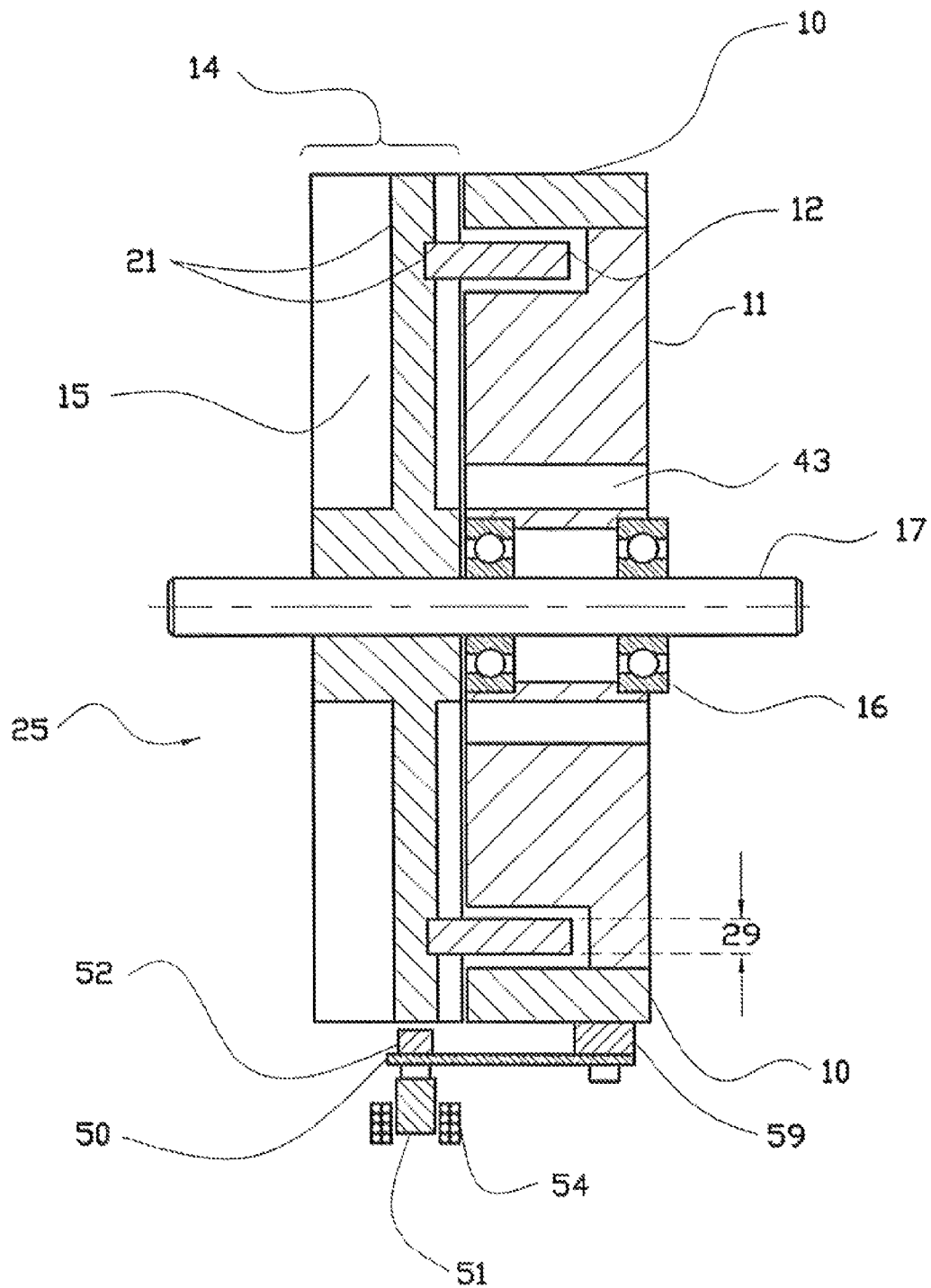
FIG. 7 is a side, sectional view of a magnetic brake having a locking device.

FIG. 7 shows a device for locking the drag plate 21 into position. A solenoid coil 54 or similar device is installed on the outer stator 10. The solenoid has a plunger 51 attached to a leaf spring 50, and the leaf spring holds the solenoid plunger 51 in place within the solenoid coil 54. The leaf spring is attached to a fitting 59, which is attached to the outer stator 10. The solenoid plunger 51 is attached to the leaf spring 50 so that does not rub against the solenoid coil. A brake pad 52 is attached to the leaf spring 50. When current is applied to the solenoid coil 54, the solenoid plunger 51 presses the brake pad against the outer circumference of the impeller 14, which in turn locks the drag ring 12 into a fixed position. After the solenoid-brake pad locks the impeller, an alternating decaying current, such as a sine wave, may be applied to the coil 13. Once the current decays to zero, the drag ring 12 has little or no residual cogging. The solenoid plunger 51 may be released to disengage the brake pad from impeller 14. The entire demagnetization takes less than 500 milliseconds. The remnant magnetic cogging torque is on the order of the bearing friction.

Using the method described above, in a magnetic brake, an output torque is obtained which varies linearly with the input signal representative of a specific or desired braking torque. In this method, the torque output of the hysteresis brake may be measured for different input currents to the coil 13 to obtain a sufficient number of points for creating polynomial expressions for the increasing and decreasing current graphs 31 and 33. Polynomial expressions may be created using a least squares polynomial fit method on the measured data. The polynomial expressions may be solved for the outer increasing current graph 31, the inner increasing current graphs 37, the outer decreasing current graph 33, and the inner decreasing current graphs for the current which to be applied to the coil 13 to obtain a torque proportional to the input signal or desired braking torque. The solutions may be provided as linearized expressions solved for the current graphs.

The method may also include measuring the angular speed of the drag ring, and correcting for torque changes due to the angular speed of the drag ring such that the brake can be operated at constant torque over a specific speed range.

Thus, novel apparatus and methods have been shown and described. Various changes and substitutions may of course be made without departing from the spirit and scope of the invention. The invention, therefore, should not be limited except by the following claims and their equivalents.

The invention claimed is:

1. A brake comprising:
   an outer stator surrounding an inner stator with an annular slot between the outer stator and the inner stator;
   a coil in the inner stator adjacent to the annular slot;
   a shaft extending centrally through the inner stator;
   a drag plate attached to the shaft;
   an impeller joined to the drag plate;
   a drag ring joined to the drag plate, with the drag ring extending into the annular slot, and with the brake providing hysteresis braking, and also braking via eddy currents in the drag ring; and
   a lock movable from a first position wherein the lock mechanically locks the drag ring against movement to a second position wherein the lock allows the drag ring to freely rotate.

2. The brake of claim 1 with the drag ring comprising an annular cylindrical ring section separate from the drag plate and attached perpendicularly onto the drag plate.

3. The brake of claim 1 further including vent holes passing through the inner stator adjacent and parallel to the shaft.

4. The brake of claim 1 wherein the coil comprises a coil ring positioned entirely within the circumferential slot.

5. The brake of claim 1 with the drag ring having an outer diameter DD and a wall thickness ranging from 0.02 DD to 0.08 DD.

6. The brake of claim 1 with the impeller having inner vanes extending radially outwardly from a central area of the impeller, and having outer vanes adjacent to an outer perimeter of the impeller.

7. The brake of claim 1 with the lock having a brake pad engaging the drag ring with the lock in the first position.

8. A combination hysteresis and eddy current brake comprising:
   an outer stator;
   an inner stator with an annular slot between the outer stator and the inner stator;
   a coil associated with at least one of the inner stator and the outer stator;
   a shaft extending centrally through the inner stator;
   a drag plate attached at least indirectly to the shaft;
   a drag ring attached to the drag plate, with the drag ring comprising an annular cylindrical ring section substantially within the annular slot, and with the drag ring having an outer diameter DD and a wall thickness ranging from 0.02 DD to 0.08 DD;
   a lock including a brake pad movable via a solenoid to lock the drag ring against movement; and
   a computer controller electrically linked to the coil and to the solenoid, with the computer controller controlling electrical current provided to the coil to provide braking torque that varies linearly with an input signal to the computer indicative of a desired braking torque, and with the computer controller actuating the solenoid to lock the drag ring while providing an alternating decaying current to the coil to reduce cogging.

9. The brake of claim 8 further including vent holes passing through the inner stator adjacent and parallel to the shaft.

10. A combination hysteresis and eddy current brake comprising:
    an outer stator;
    an inner stator with an annular slot between the outer stator and the inner stator;
    a coil associated with at least one of the inner stator and the outer stator;
    a shaft extending centrally through the inner stator;
    a drag plate attached at least indirectly to the shaft;
    a drag ring joined to the drag plate, with the drag ring extending into the annular slot, and with the brake providing hysteresis braking, and also braking via eddy currents in the drag ring;
    a computer controller electrically linked to the coil and controlling electrical current provided to the coil to provide braking torque that varies linearly with an input signal to the computer indicative of a desired braking torque; and a lock including a brake pad movable via a solenoid to lock the drag ring against movement, and with the solenoid controlled via the computer controller.

11. The brake of claim 10 with the computer providing an alternating decaying current to the coil when the solenoid is actuated.

\* \* \* \* \*